United States Patent
Lin et al.

(10) Patent No.: US 8,509,560 B2
(45) Date of Patent: *Aug. 13, 2013

(54) METHOD, APPARATUS AND INTEGRATED CIRCUIT FOR IMPROVING IMAGE SHARPNESS

(75) Inventors: Chih-Jung Lin, Taipei County (TW); Pei-Lin Hoi, Taipei County (TW)

(73) Assignee: Panasonic Corporation, Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/566,351

(22) Filed: Aug. 3, 2012

(65) Prior Publication Data

US 2012/0301035 A1 Nov. 29, 2012

Related U.S. Application Data

(63) Continuation of application No. 12/375,112, filed as application No. PCT/JP2007/065891 on Aug. 8, 2007, now Pat. No. 8,265,416.

(30) Foreign Application Priority Data

Aug. 11, 2006 (CN) .......................... 2006 1 0110983

(51) Int. Cl.
*G06K 9/40* (2006.01)
(52) U.S. Cl.
USPC ........... 382/266; 382/254; 382/260; 382/263; 382/268; 382/199; 348/606; 358/1.9; 358/3.27
(58) Field of Classification Search
None
See application file for complete search history.

(56) References Cited

U.S. PATENT DOCUMENTS

| | | | |
|---|---|---|---|
| 4,945,502 A | 7/1990 | Kwon et al. | |
| 5,862,266 A | 1/1999 | Hunter | |
| 5,920,356 A | 7/1999 | Gupta et al. | |
| 6,028,646 A | 2/2000 | Jeong et al. | |
| 6,285,801 B1 | 9/2001 | Mancuso et al. | |
| 2001/0031097 A1 | 10/2001 | Mancuso et al. | |
| 2003/0021448 A1* | 1/2003 | Chen et al. | 382/117 |
| 2005/0105830 A1 | 5/2005 | Chung et al. | |
| 2005/0135701 A1 | 6/2005 | Atkins | |
| 2006/0017773 A1 | 1/2006 | Sheraizin et al. | |
| 2006/0034512 A1 | 2/2006 | Sheraizin et al. | |
| 2007/0058725 A1 | 3/2007 | Iguchi et al. | |
| 2007/0109703 A1 | 5/2007 | Shimura | |
| 2007/0223876 A1 | 9/2007 | Hashimoto et al. | |
| 2007/0230573 A1 | 10/2007 | Iguchi et al. | |
| 2008/0259214 A1 | 10/2008 | Tsumura et al. | |
| 2008/0260284 A1 | 10/2008 | Lin et al. | |
| 2009/0310882 A1 | 12/2009 | Lin et al. | |
| 2010/0061649 A1 | 3/2010 | Hou et al. | |

FOREIGN PATENT DOCUMENTS

EP 0961229 12/1999

* cited by examiner

*Primary Examiner* — Matthew Bella
*Assistant Examiner* — Jason Heidemann
(74) *Attorney, Agent, or Firm* — Greenblum & Bernstein, P.L.C.

(57) ABSTRACT

An apparatus for improving image sharpness includes a pixel detector that labels each of pixels in an image as one of an edge/texture type and a non-edge/texture type, a pixel type determiner that classifies each of the pixels that are labeled as the edge/texture type as one of a border point type pixel, a transition point type pixel, and a peak point type pixel, and a filter. The filter includes a shrinking/expanding filter and a high boost filter, the shrinking/expanding filter filtering the border point type pixels, and the high boost filter subsequently filtering the peak point type pixels and then filtering the transition point type pixels.

15 Claims, 4 Drawing Sheets

Fig.3
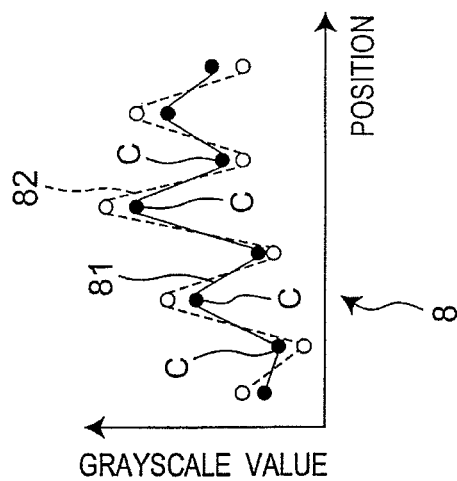
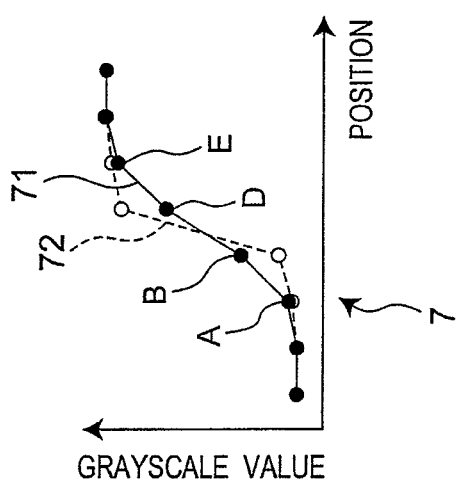
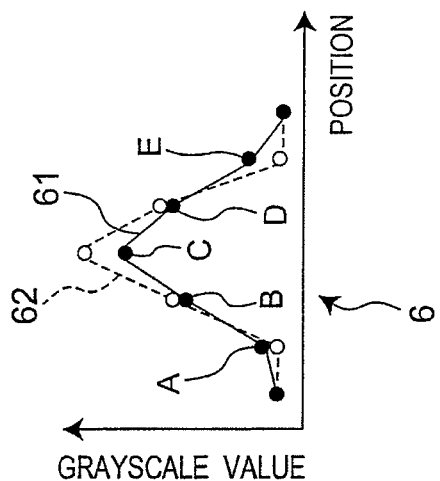

METHOD, APPARATUS AND INTEGRATED CIRCUIT FOR IMPROVING IMAGE SHARPNESS

CROSS-REFERENCE RELATED TO APPLICATION

This application is a continuation of pending U.S. application Ser. No. 12/375,112, filed on Jan. 26, 2009, which is a National Stage Application of PCT/JP2007/065891, filed Aug. 8, 2007, which claims the benefit of Chinese Application No. 2006-10110983.X, filed on Aug. 11, 2006, the contents of which are expressly incorporated herein by reference in their entireties.

TECHNICAL FIELD

The invention relates to a method, apparatus and integrated circuit for improving image sharpness, and more particularly to a method, apparatus and integrated circuit for reducing ringing noise and improving image sharpness.

BACKGROUND ART

Image enhancement is often used to improve image quality, and image sharpening is one way of achieving image enhancement.

Generally speaking, a conventional image sharpening method typically includes the following steps. Initially, a plurality of edge pixels in an image are detected. Subsequently, the grayscale intensity of the detected edge pixels and their surrounding pixels is changed to achieve the effect of enhancing image sharpness. Although such a method can enhance contrast between the detected edge pixels and their surrounding pixels, the grayscale intensity of the detected edge pixels and their surrounding pixels may be changed so much that the contrast between the detected edge pixels and their surrounding pixels is excessive, thereby resulting in the generation of clipping and ringing in the image. This may cause the human eyes to easily perceive unnatural over-sharpening in the image.

In order to overcome the over-sharpening drawback, U.S. Patent Application Publication No. US20050135701, for example, discloses a method including the following steps. First, a set of detected edges in an image is acquired. Subsequently, a set of exemplary edges is determined from the set of detected edges in the image. Thereafter, the degree of image sharpening is predicted based on the set of exemplary edges, and an average normalized overshoot percentage (hereinafter referred to as OS) is obtained accordingly. Finally, using the OS as a determination parameter, as set forth below, a determination is made as the manner to further improve the sharpness of the image.

If $OS < 15\%$, perform complete sharpening processing
If $15\% \leq OS < 25\%$, perform partial sharpening processing
If $25\% \leq OS < 35\%$, perform no sharpening processing
If $OS \geq 35\%$, perform blurring processing If the OS value is large, this indicates that the degree of image sharpening is high. For instance, if $OS \geq 35\%$, this indicates that the image has been over-sharpened and requires blurring or de-sharpening processing. On the other hand, if the OS value is small, this indicates that the degree of sharpening of the image is low or the image is blurry. For instance, if $OS < 15\%$, this indicates that the image has not been adequately sharpened and requires complete sharpening processing.

Since the OS value is used as the determination parameter, the degree of image sharpening can be limited so as to solve the problem of over-sharpening. However, the generation of ringing noise at the edges of the image still cannot be avoided after the aforesaid processing. Therefore, prior art apparently has room for improvement.

DISCLOSURE OF INVENTION

Therefore, the main object of the present invention is to provide a method for improving image sharpness.

Accordingly, the method for improving image sharpness of the present invention includes the following steps: (a) labeling each of pixels in an image as one of an edge/texture type and a non-edge/texture type; (b) classifying each of the pixels that are labeled as the edge/texture type as one of a border point type, a transition point type, and a peak point type; and (c) using a shrinking/expanding filter to filter the pixels of the border point type, and subsequently using a high boost filter to first filter the pixels of the peak point type and then filter the pixels of the transition point type to sharpen the image.

Another object of the present invention is to provide an apparatus for improving image sharpness.

Accordingly, the apparatus for improving image sharpness of the present invention includes a pixel detecting unit, a pixel type determining unit, and a filter unit. The pixel detecting unit is used to label each of pixels in an image as one of an edge/texture type and a non-edge/texture type. The pixel type determining unit is used to classify each of the pixels that are labeled as the edge/texture type as one of a border point type, a transition point type, and a peak point type. The filter unit includes a shrinking/expanding filter and a high boost filter, where the shrinking/expanding filter is used to filter the pixels of the border point type pixels and the high boost filter is subsequently used to first filter the pixels of the peak point type and then filter the pixels of the transition point type.

A further object of the present invention is to provide an integrated circuit for improving image sharpness.

Accordingly, the integrated circuit for improving image sharpness of the present invention includes a pixel detecting unit, a pixel type determining unit, and a filter unit. The pixel detecting unit is used to label each of pixels in an image as one of an edge/texture type and a non-edge/texture type. The pixel type determining unit is used to classify each of the pixels that are labeled as the edge/texture type as one of a border point type, a transition point type, and a peak point type. The filter unit includes a shrinking/expanding filter and a high boost filter, where the shrinking/expanding filter is used to filter the pixels of the border point type and the high boost filter is subsequently used to first filter the pixels of the peak point type and then filter the pixels of the transition point type.

In the present invention, all the pixels in the image are first labeled as the edge/texture type or the non-edge/texture type. The pixels of the edge/texture type are subsequently classified as the border point type, the transition point type, or the peak point type, and different point types of pixels are subjected to appropriate filtering processing. After processing, not only the sharpness of the image can be improved, but over-sharpness and generation of ringing noise can also be prevented, thereby achieving the objects of this invention.

BRIEF DESCRIPTION OF DRAWINGS

Other features and advantages of the present invention will become apparent in the following detailed description of the preferred embodiment with reference to the accompanying drawings, of which:

FIG. 3 is a schematic diagram to illustrate comparisons of relative relationships between position and grayscale value of a pixel of an edge/texture type before and after the pixel is processed according to the present invention.

BEST MODE FOR CARRYING OUT THE INVENTION

Figure 1:
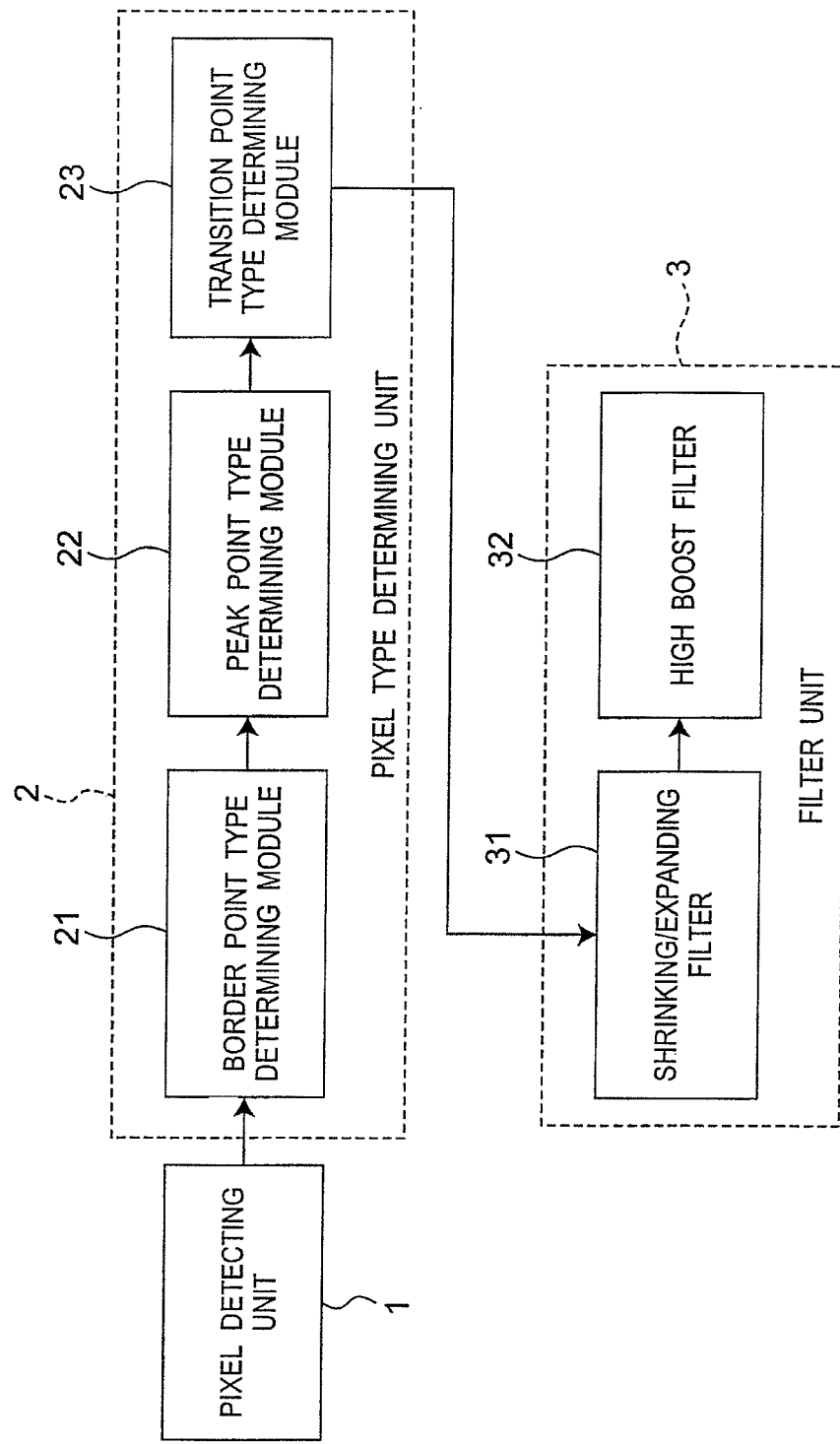
FIG. 1 is a function block diagram to illustrate a preferred embodiment of an apparatus for improving image sharpness according to the present invention.
Figure 2:
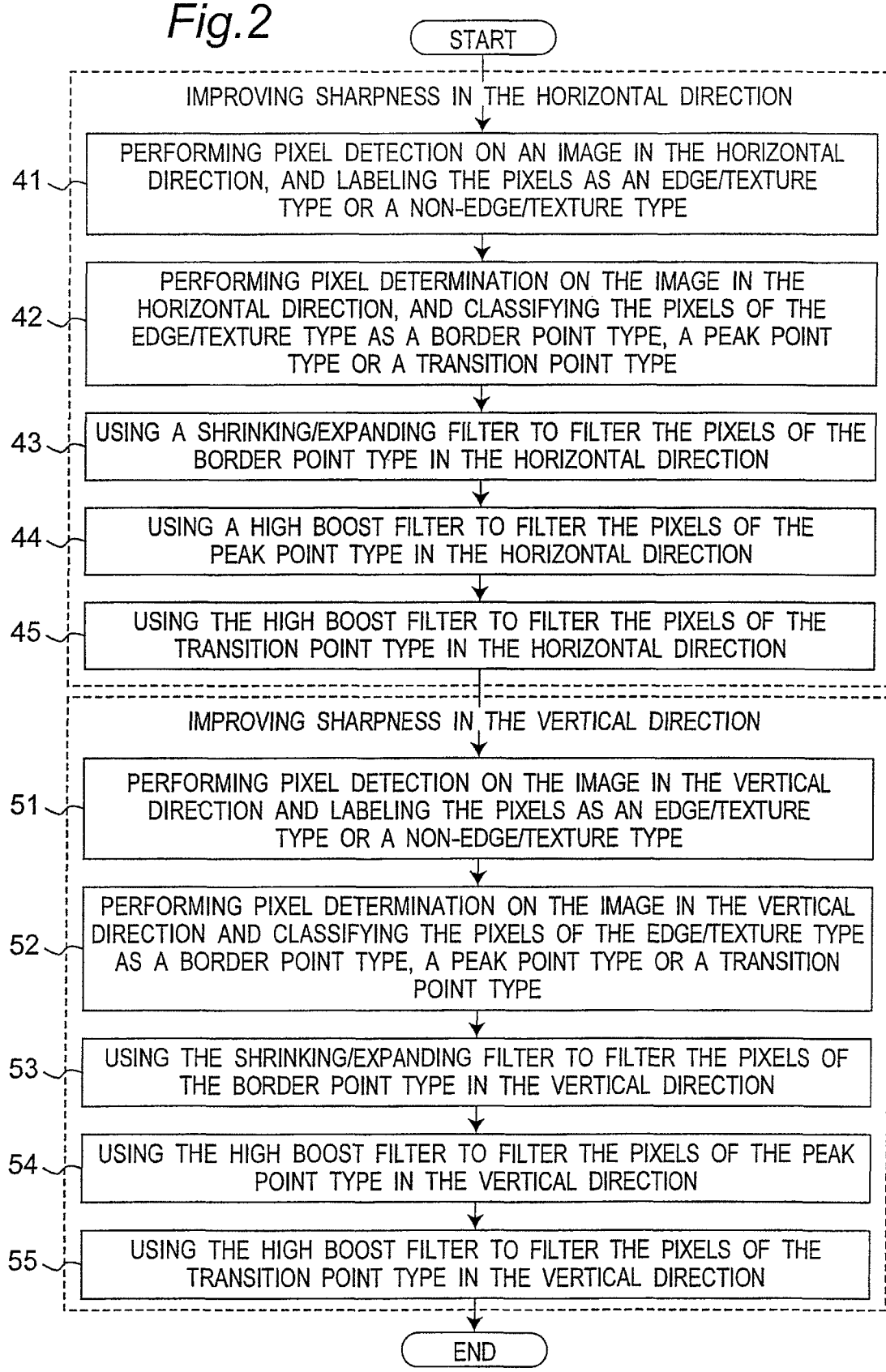
FIG. 2 is a flowchart to illustrate a preferred embodiment of a method for improving image sharpness according to the present invention.

Referring to FIGS. 1, 2 and 3, the preferred embodiment of an apparatus for improving image sharpness according to the present invention is used to sharpen an image while avoiding unnatural over-sharpening and the generation of ringing noise, where the image includes a plurality of pixels.

As shown in FIG. 1, the apparatus includes a pixel detecting unit 1, a pixel type determining unit 2, and a filter unit 3. The pixel type determining unit 2 includes a border point type determining module 21, a peak point type determining module 22, and a transition point type determining module 23. The filter unit 3 includes a shrinking/expanding filter 31 and a high boost filter 32. In this preferred embodiment, the image is processed in the horizontal direction and the vertical direction respectively.

As shown in FIG. 2, the following steps 41 to 45 are directed to the processing of the image in the horizontal direction.

In step 41, the pixel detecting unit 1 calculates a horizontal gradient value $G_x(i,j)$ according to a grayscale value $\phi(i,j)$ of a pixel at a two-dimensional position (i,j), which can be expressed as follows:

$$G_x(i, j) = \nabla_x \phi(i, j) = \frac{\partial \phi(i, j)}{\partial x} = \phi(i, j) - \phi(i-1, j) \quad (1)$$

Subsequently, a horizontal classification flag $P_x(i,j)$ representing a classification type of the pixel at the position (i,j) is defined. If the absolute value of the horizontal gradient value $G_x(i,j)$ of the pixel is greater than a gradient threshold value, the horizontal classification flag $P_x(i,j)$ of the pixel is labeled as an edge/texture type. Otherwise, the horizontal classification flag $P_x(i,j)$ of the pixel is labeled as a non-edge/texture type.

Finally, for each pixel whose horizontal classification flag $P_x(i,j)$ is labeled as the edge/texture type, a determination is made as to whether the horizontal classification flags $P_x(i-1,j)$ and $P_x(i+1,j)$ of adjacent left and right pixels are both labeled as the non-edge/texture type. If affirmative, the horizontal classification flag $P_x(i,j)$ of the pixel is changed and is labeled as the non-edge/texture type.

In step 42, the pixel type determining unit 2 is used to further classify the pixels of the edge/texture type as a border point type, a peak point type, or a transition point type. In order to make the following description clearer, the pixels of the edge/texture type can be represented by the three patterns shown in FIG. 3, which are a double edge pattern 6, a single edge pattern 7, and a texture pattern 8, respectively. The horizontal axis of each pattern is the position of a pixel, and the vertical axis thereof is a grayscale value of the pixel. The relative relationship between the position and the grayscale value of a pixel prior to processing are represented by curves 61, 71, and 81.

Initially, a horizontal point type flag $T_x(i,j)$ representing the point type classification of a pixel at position (i,j) is defined. For each pixel whose horizontal classification flag $P_x(i,j)$ is labeled as the edge/texture type, the border point type determining module 21 determines whether any horizontal classification flag $P_x(i-1,j)$ or $P_x(i+1,j)$ of adjacent left and right pixels thereof is labeled as a non-edge/texture type. If affirmative, the pixel is classified as the border point type. The pixel of the border point type can be further classified as type A or type E on the curve 61 or 71 according to the position thereof. The method of classification is as follows:

$$\begin{cases} \text{If } P_x(i-1, j) \text{ is a non-edge/texture type,} \\ \quad T_x(i, j) \text{ is set to be type } A \\ \text{If } P_x(i+1, j) \text{ is a non-edge/texture type,} \\ \quad T_x(i, j) \text{ is set to be type } E \end{cases} \quad (2)$$

Subsequently, for each pixel whose horizontal classification flag $P_x(i,j)$ is labeled as the edge/texture type, the peak point type determining module 22 determines whether the product of the horizontal gradient value $G_x(i,j)$ of the pixel and the horizontal gradient value $G_x(i+1,j)$ of an adjacent right pixel is smaller than 0. If affirmative, the pixel is classified as the peak point type, i.e., type C on curves 61 and 81.

Finally, the transition point type determining module 23 classifies the remaining pixels that are labeled as the edge/texture type but are not classified as the border point type or the peak point type as the transition point type, i.e., type B or type D on curve 61 or 71.

In step 43, the shrinking/expanding filter 31 is used to filter each pixel whose horizontal point type flag $T_x(i,j)$ is type A or type E, which can be expressed as follows:

$$\begin{cases} \text{If } T_x(i, j) \text{ is type } A, \\ \text{coefficients of the filter are: } \frac{1}{2a+b+c} \begin{bmatrix} 0 & 0 & a \\ b & c & 0 \\ 0 & 0 & a \end{bmatrix} \\ \text{If } T_x(i, j) \text{ is type } E, \\ \text{coefficients of the filter are: } \frac{1}{2a+b+c} \begin{bmatrix} a & 0 & 0 \\ 0 & c & b \\ a & 0 & 0 \end{bmatrix} \end{cases} \quad (3)$$

where, if the horizontal point type flag $T_x(i,j)$ of the pixel is type A, matrix coordinate (2,3) corresponds to the pixel position (i,j), and if the horizontal point type flag $T_x(i,j)$ of the pixel is type E, matrix coordinate (2,1) corresponds to the pixel position (i,j). One way of setting the coefficients is to have the value of b equal to 2 times the value of a, and to have the value of c be 2 times the value of b.

In step 44, the high boost filter 32 is used to filter each pixel whose horizontal point type flag $T_x(i,j)$ is type C, which can be expressed as:

$$\text{If } T_x(i, j) \text{ is type } C, \text{ coefficients of the filter are:} \frac{1}{2a+b}\begin{bmatrix} 0 & 0 & 0 \\ a & b & a \\ 0 & 0 & 0 \end{bmatrix} \quad (4)$$

where matrix coordinate (2,2) corresponds to the pixel position (i,j). One way of setting the coefficients is to have the sign of value b opposite to that of value a, and to have the absolute value of b equal to 4 times the absolute value of a.

In step 45, the high boost filter 32 is used to filter each pixel whose horizontal point type flag $T_x(i,j)$ is type B or type D, which can be expressed as:

$$\text{If } T_x(i, j) \text{ is type } B \text{ or type } D, \quad (5)$$

$$\text{coefficients of the filter are:} \frac{1}{2a+b}\begin{bmatrix} 0 & 0 & 0 \\ a & b & a \\ 0 & 0 & 0 \end{bmatrix}$$

where matrix coordinate (2,2) corresponds to the pixel position (i,j). One way of setting the coefficients is to have the sign of value b opposite to that of value a, and to have the absolute value of b equal to 4 times the absolute value of a.

The following steps 51 to 55 are directed to the processing of the image in the vertical direction. The operational flow is substantially the same as that in steps 41 to 45, except that the calculated directions of coordinates are different. Thus, only the differences will be described hereinbelow.

In step 51, a vertical gradient value $$G_y(i, j) = \nabla_y \phi(i, j) = \frac{\partial \phi(i, j)}{\partial y} = \phi(i, j) - \phi(i, j-1)$$

of each pixel is first calculated. Subsequently, a vertical classification flag $P_y(i,j)$ representing a classification type of a pixel at position (i,j) is defined. If the absolute value of the vertical gradient value $G_y(i,j)$ of the pixel is greater than a gradient threshold value, the vertical classification flag $P_y(i,j)$ of the pixel is labeled as the edge/texture type. Otherwise, the vertical classification flag $P_y(i,j)$ of the pixel is labeled as the non-edge/texture type. Finally, for each pixel whose vertical classification flag $P_y(i,j)$ is labeled as the edge/texture type, a determination is made as to whether the vertical classification flags $P_y(i,j-1)$ and $P_y(i,j+1)$ of adjacent upper and lower pixels are both labeled as the non-edge/texture type. If affirmative, the vertical classification flag $P_y(i,j)$ of the pixel is changed and is labeled as the non-edge/texture type.

In step 52, a vertical point type flag $T_y(i,j)$ representing the point type classification of the pixel at position (i,j) is first defined. The border point type determining module 21 executes the following classification determinations, where the pixel of the border point type can be further classified as type A or type E on the curve 61 or 71 according to the position thereof:

$$\begin{cases} \text{If } P_y(i, j-1) \text{ is non-edge/texture type,} \\ \quad T_y(i, j) \text{ is set to be type } A \\ \text{If } P_y(i, j+1) \text{ is non-edge/texture type,} \\ \quad T_y(i, j) \text{ is set to be type } E \end{cases} \quad (6)$$

Subsequently, for each pixel whose vertical classification flag $P_y(i,j)$ is labeled as the edge/texture type, the peak point type determining module 22 determines whether the product of the vertical gradient value $G_y(i,j)$ thereof and the vertical gradient value $G_y(i,j+1)$ of an adjacent upper pixel is smaller than 0. If affirmative, the pixel is classified as the peak point type, i.e., type C on curves 61 and 81.

Finally, the transition point type determining module 23 classifies the remaining pixels that are labeled as the edge/texture type but are not classified as the border point type or the peak point type as the transition point type, i.e., type B or type D on curve 61 or 71.

In step 53, the shrinking/expanding filter 31 is used to filter each pixel whose vertical point type flag $T_y(i,j)$ is type A or type E, which can be expressed as:

$$\begin{cases} \text{If } T_y(i, j) \text{ is type } A, \\ \quad \text{coefficients of the filter are:} \frac{1}{2a+b+c}\begin{bmatrix} 0 & b & 0 \\ 0 & c & 0 \\ a & 0 & a \end{bmatrix} \\ \text{If } T_y(i, j) \text{ is type } E, \\ \quad \text{coefficients of the filter are:} \frac{1}{2a+b+c}\begin{bmatrix} a & 0 & a \\ 0 & c & 0 \\ 0 & b & 0 \end{bmatrix} \end{cases} \quad (7)$$

where, if the vertical point type flag $T_y(i,j)$ of the pixel is type A, matrix coordinate (3,2) corresponds to the pixel position (i,j), and if the vertical point type flag $T_y(i,j)$ of the pixel is type E, matrix coordinate (1,2) corresponds to the pixel position (i,j). One way of setting the coefficients is to have the value of b equal to 2 times the value of a, and to have the value of c equal to 2 times the value of b.

In step 54, the high boost filter 32 is used to filter each pixel whose vertical point type flag $T_y(i,j)$ is type C, which can be expressed as:

$$\text{If } T_y(i, j) \text{ is type } C, \text{ coefficients of the filter are:} \frac{1}{2a+b}\begin{bmatrix} 0 & a & 0 \\ 0 & b & 0 \\ 0 & a & 0 \end{bmatrix} \quad (8)$$

where matrix coordinate (2,2) corresponds to the pixel position (i,j). One way of setting the coefficients is have the sign of value b opposite to that of value a, and to have the absolute value of b equal to 4 times the absolute value of a.

In step 55, the high boost filter 32 is used to filter each pixel whose vertical point type flag $T_y(i,j)$ is type B or type D, which can be expressed as:

$$\text{If } T_y(i, j) \text{ is type } B \text{ or type } D, \quad (9)$$

$$\text{coefficients of the filter are:} \frac{1}{2a+b}\begin{bmatrix} 0 & a & 0 \\ 0 & b & 0 \\ 0 & a & 0 \end{bmatrix}$$

where matrix coordinate (2,2) corresponds to the pixel position (i,j). One way of setting the coefficients is to have the sign of value b opposite to that of value a, and to have the absolute value of b equal to 4 times the absolute value of a.

After executing the aforesaid steps 41 to 45, and steps 51 to 55, results represented by the curves 62, 72 and 82 as shown in FIG. 3 can be obtained for each direction.

In addition, the integrated circuit for improving image sharpness according to the present invention includes the pixel detecting unit 1, the pixel type determining unit 2, and the filter unit 3 as shown in FIG. 1.

Figure 4:
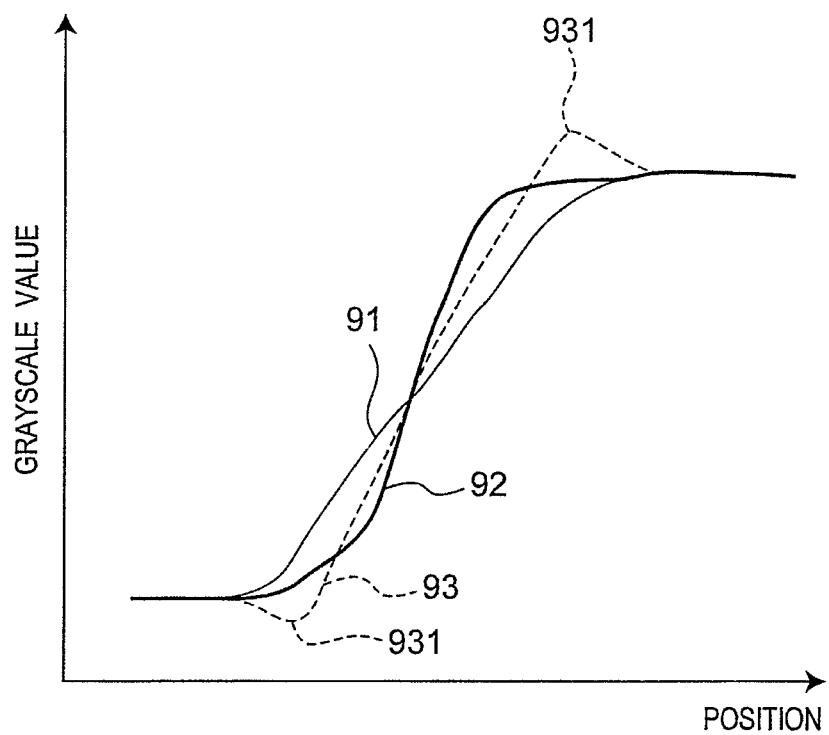
FIG. 4 is a schematic diagram to illustrate comparison results of a single edge pattern before and after being processed according to the present invention and a conventional method.

Referring to FIGS. 1, 2 and 4, differences in results between the present invention and conventional techniques are illustrated below using a single edge pattern as an example. Curve 91 represents the relative relationship between position and grayscale value prior to processing. Curve 92 represents the relative relationship between position and grayscale value after processing using the technique according to the present invention. Curve 93 represents the relative relationship between position and grayscale value after processing using a conventional technique (such as that disclosed in U.S. Patent Application Publication No. US20050135701). A comparison of curves 92 and 93 shows that the effect of enhanced image sharpness can be achieved after processing using the present invention and the conventional technique. The difference between the two resides in that ringing noise 931 such as that in curve 93 will be generated after processing using the conventional technique.

In sum, the method, apparatus and integrated circuit for improving image sharpness according to the present invention have the following advantages. First, the pixels of the non-edge/texture type are labeled at the start of processing and are excluded from subsequent filtering processing. Therefore, the pixels of the non-edge/texture type will not be sharpened improperly. Second, by using the shrinking/expanding filter to enhance the edge portions of the image, over-sharpening and the generation of ringing noise can be avoided. Furthermore, contrast in the texture portions of the image is enhanced by using the high boost filter. The objects of the present invention can thus be achieved.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

INDUSTRIAL APPLICABILITY

The present invention can be applied to a method and apparatus for improving the image sharpness.

The invention claimed is:

1. A method for improving image sharpness, comprising:
   detecting each pixel of an image;
   labeling each pixel in the image as one of an edge/texture type and a non-edge/texture type;
   determining a type of pixel by classifying each labeled pixel as the edge/texture type as one of a border point type, a transition point type, and a peak point type; and
   using a shrinking/expanding filter to filter each border point type pixel, and subsequently using a high boost filter to first filter each peak point type pixel and then filter each transition point type pixel to sharpen the image.

2. The method for improving image sharpness according to claim 1, wherein, when the image is processed in the horizontal direction, the labeling further includes:
   calculating a horizontal gradient value for each pixel based on a grayscale value of the pixel;
   labeling a pixel as the edge/texture type if an absolute value of the horizontal gradient value of the pixel is greater than a gradient threshold value, and otherwise labeling the pixel as the non-edge/texture type; and
   determining whether adjacent left and right pixels of the pixel labeled as the edge/texture type are both labeled as the non-edge/texture type, the pixel being relabeled as the non-edge/texture type if the determination is affirmative.

3. The method for improving image sharpness according to claim 2, wherein the classifying further comprises:
   determining whether any one of the adjacent left and right pixels, of the pixel labeled as the edge/texture type, is labeled as the non-edge/texture type, the pixel which is labeled as the edge/texture type being classified as the border point type if the edge/texture type determination is affirmative;
   determining whether the product of the horizontal gradient value of the pixel labeled as the edge/texture type and the horizontal gradient value of an adjacent right pixel is smaller than 0, the pixel which is labeled as the edge/texture type being classified as the peak point type if the product determination is affirmative; and
   classifying the remaining pixels that are labeled as the edge/texture type.

4. The method for improving image sharpness according to claim 1, wherein, when the image is processed in the vertical direction, the labeling further includes:
   calculating a vertical gradient value for each of the pixels based on a grayscale value of the pixel;
   labeling a pixel as the edge/texture type if an absolute value of the vertical gradient value of the pixel is greater than a gradient threshold value, and otherwise labeling the pixel as the non-edge/texture type; and
   determining whether adjacent upper and lower pixels of the pixel labeled as the edge/texture type are both labeled as the non-edge/texture type, the pixel being relabeled as the non-edge/texture type if the label determination is affirmative.

5. The method for improving image sharpness according to claim 4, wherein the classifying further comprises:
   determining whether any one of the adjacent upper and lower pixels, of the pixel labeled as the edge/texture type, is labeled as the non-edge/texture type, the pixel which is labeled as the edge/texture type being classified as the border point type if the edge/texture type determination is affirmative;
   determining whether the product of the vertical gradient value of the pixel labeled as the edge/texture type and the vertical gradient value of an adjacent upper pixel is smaller than 0, the pixel which is labeled as the edge/texture type being classified as the peak point type if the product determination is affirmative; and
   classifying the remaining pixels that are labeled as the edge/texture type.

6. An apparatus for improving image sharpness, comprising:
   a pixel detector that detects each pixel of an image;
   a labeler that labels each of the pixels in the image as one of an edge/texture type and a non-edge/texture type;
   a pixel type determiner that classifies each of the pixels that are labeled as the edge/texture type as one of a border point type pixel, a transition point type pixel, and a peak point type pixel; and
   a filter, including a shrinking/expanding filter and a high boost filter, said shrinking/expanding filter filtering the border point type pixels, said high boost filter subsequently filtering the peak point type pixels and then filtering the transition point type pixels;
   wherein at least one of the pixel detector, the pixel type determiner and the filter comprises a processor.

7. The apparatus for improving image sharpness according to claim 6, wherein, when the image is processed in the horizontal direction, said pixel detector calculates a horizontal gradient value for each of the pixels based on a grayscale value of the pixel, a pixel being labeled as the edge/texture type if an absolute value of the horizontal gradient value of the pixel is greater than a gradient threshold value, and otherwise being labeled as the non-edge/texture type, said pixel detector subsequently determining whether adjacent left and right pixels of the pixel labeled as the edge/texture type are both labeled as the non-edge/texture type, the pixel being relabeled as the non-edge/texture type if the subsequent determination is affirmative.

8. The apparatus for improving image sharpness according to claim 7, wherein said pixel type determiner includes:
   a border point type determiner that determines whether any one of the adjacent left and right pixels of the pixel labeled as the edge/texture type is labeled as the non-edge/texture type, the pixel which is labeled as the edge/texture type being classified as the border point type if the border point type determination is affirmative;
   a peak point type determiner that determines whether the product of the horizontal gradient value of the pixel labeled as the edge/texture type and the horizontal gradient value of an adjacent right pixel is smaller than 0, the pixel which is labeled as the edge/texture type being classified as the peak point type if the peak point type determination is affirmative; and
   a transition point type determiner that classifies the remaining pixels that are labeled as the edge/texture type.

9. The apparatus for improving image sharpness according to claim 6, wherein, when the image is processed in the vertical direction, said pixel detector calculates a vertical gradient value for each of the pixels based on a grayscale value of the pixel, a pixel being labeled as the edge/texture type if an absolute value of the vertical gradient value of the pixel is greater than a gradient threshold value, and otherwise being labeled as the non-edge/texture type, said pixel detector subsequently determining whether adjacent upper and lower pixels of the pixel labeled as the edge/texture type are both labeled as the non-edge/texture type, the pixel being relabeled as the non-edge/texture type if the determining is affirmative.

10. The apparatus for improving image sharpness according to claim 9, wherein said pixel type determiner includes:
   a border point type determiner that determines whether any one of the adjacent upper and lower pixels of the pixel labeled as the edge/texture type is labeled as the non-edge/texture type, the pixel which is labeled as the edge/texture type being classified as the border point type if the border point type determining is affirmative;
   a peak point type determiner that determines whether the product of the vertical gradient value of the pixel labeled as the edge/texture type and the vertical gradient value of an adjacent upper pixel is smaller than 0, the pixel which is labeled as the edge/texture type being classified as the peak point type if the peak point type determination is affirmative; and
   a transition point type determiner that classifies the remaining pixels that are labeled as the edge/texture type.

11. An integrated circuit for improving image sharpness, comprising:
   a pixel detector that detects each pixel in an image;
   a labeler that labels each pixel of the image as one of an edge/texture type and a non-edge/texture type;
   a pixel type determiner that classifies each of the pixels that are labeled as the edge/texture type as one of a border point type pixel, a transition point type pixel, and a peak point type pixel; and
   a filter including a shrinking/expanding filter and a high boost filter, said shrinking/expanding filter filtering the border point type pixels, said high boost filter subsequently filtering the peak point type pixels and then filtering the transition point type pixels.

12. The integrated circuit for improving image sharpness according to claim 11, wherein, when the image is processed in the horizontal direction, said pixel detector calculates a horizontal gradient value for each of the pixels based on a grayscale value of the pixel, a pixel being labeled as the edge/texture type if an absolute value of the horizontal gradient value is greater than a gradient threshold value, and being otherwise labeled as the non-edge/texture type, said pixel detector subsequently determines whether adjacent left and right pixels of the pixel labeled as the edge/texture type are both labeled as the non-edge/texture type, the pixel being relabeled as the non-edge/texture type if the subsequent determination is affirmative.

13. The integrated circuit for improving image sharpness according to claim 12, wherein said pixel type determiner includes:
   a border point type determiner that determines whether any one of the adjacent left and right pixels of the pixel labeled as the edge/texture type is labeled as the non-edge/texture type, the pixel which is labeled as the edge/texture type being classified as the border point type if the border point type determination is affirmative;
   a peak point type determiner that determines whether the product of the horizontal gradient value of the pixel labeled as the edge/texture type and the horizontal gradient value of an adjacent right pixel is smaller than 0, the pixel which is labeled as the edge/texture type being classified as the peak point type if the peak point type determination is affirmative; and
   a transition point type determiner that classifies the remaining pixels that are labeled as the edge/texture type.

14. The integrated circuit for improving image sharpness according to claim 11, wherein, when the image is processed in the vertical direction, said pixel detector calculates a vertical gradient value for each of the pixels based on a grayscale value of the pixel, a pixel being labeled as the edge/texture type if an absolute value of the vertical gradient value of the pixel is greater than a gradient threshold value, and otherwise being labeled as the non-edge/texture type, said pixel detector subsequently determining whether adjacent upper and lower pixels of the pixel labeled as the edge/texture type are both labeled as the non-edge/texture type, the respective pixel being relabeled as the non-edge/texture type if the subsequent determining is affirmative.

15. The integrated circuit for improving image sharpness according to claim 14, wherein said pixel type determiner includes:
   a border point type determiner that determines whether any one of the adjacent upper and lower pixels of the pixel labeled as the edge/texture type is labeled as the non-edge/texture type, the pixel which is labeled as the edge/texture type being classified as the border point type if the border point type determination is affirmative;
   a peak point type determiner that determines whether the product of the vertical gradient value of the pixel labeled as the edge/texture type and the vertical gradient value of an adjacent upper pixel is smaller than 0, the pixel which is labeled as the edge/texture type being classified as the peak point type if the peak point determination is affirmative; and
   a transition point type determiner that classifies the remaining pixels that are labeled as the edge/texture type.

* * * * *